United States Patent [19]

Guion

[11] Patent Number: 4,675,516

[45] Date of Patent: Jun. 23, 1987

[54] APPARATUS FOR READING ELECTRONIC MEMORY CARDS

[75] Inventor: Christian Guion, Verrieres le Buisson, France

[73] Assignee: Flonic, Montrouge, France

[21] Appl. No.: 664,716

[22] Filed: Oct. 25, 1984

[30] Foreign Application Priority Data

Oct. 27, 1983 [FR] France ............................. 83 17135

[51] Int. Cl.⁴ ............................................. G06K 7/01
[52] U.S. Cl. .................................. 235/441; 235/444; 235/485; 235/492
[58] Field of Search ................ 235/441, 485, 444, 492

[56] References Cited

U.S. PATENT DOCUMENTS

| 3,678,250 | 7/1972 | Dethloff | 235/441 |
|---|---|---|---|
| 3,818,189 | 6/1974 | Stone et al. | 235/485 |
| 3,849,631 | 11/1974 | Merlino | 235/485 |
| 3,906,201 | 9/1975 | Housman | 235/441 |
| 4,086,442 | 4/1978 | Rickard | 235/444 |
| 4,404,464 | 9/1983 | Moreno | 235/441 |
| 4,501,960 | 2/1985 | Jouvet | 235/492 |
| 4,523,297 | 6/1985 | Ugon | 235/492 |

FOREIGN PATENT DOCUMENTS 2477303 4/1981 France .

OTHER PUBLICATIONS

Credit Card Reader, G. W. Bowers, Jr. and E. G. Laenen, IBM Technical Disclosure Bulletin, vol. 9, No. 12, May 1967, pp. 1760-1761.

Primary Examiner—Harold I. Pitts
Attorney, Agent, or Firm—Dale Gaudier

[57] ABSTRACT

A card reader for electronic memory cards of the type which include a integrated circuit and integral electrical contact pads. The card reader includes a slot for introduction of the card. Within the slot are a series of contact elements for supplying power and information signals to the contact pads on the memory card. A card position detector, e.g. a microswitch, detects when the card is in the correct position, i.e. when the contact elements are contacting the electric contact pads of the memory card. When the card is so positioned, electric power and information signals are applied to the contact elements and then to the integrated circuit of the memory card via the electric contact pads.

5 Claims, 5 Drawing Figures

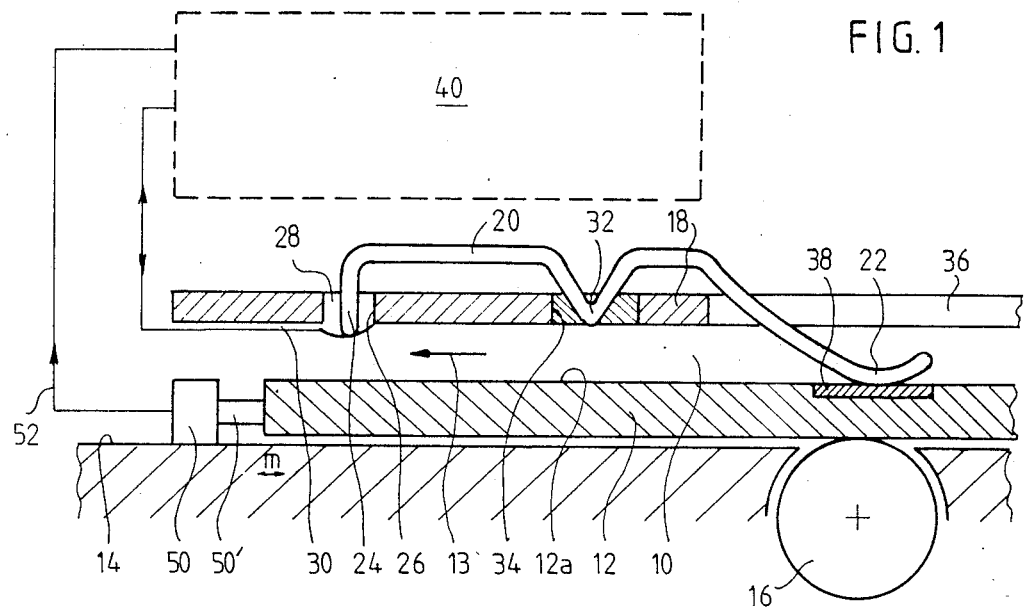
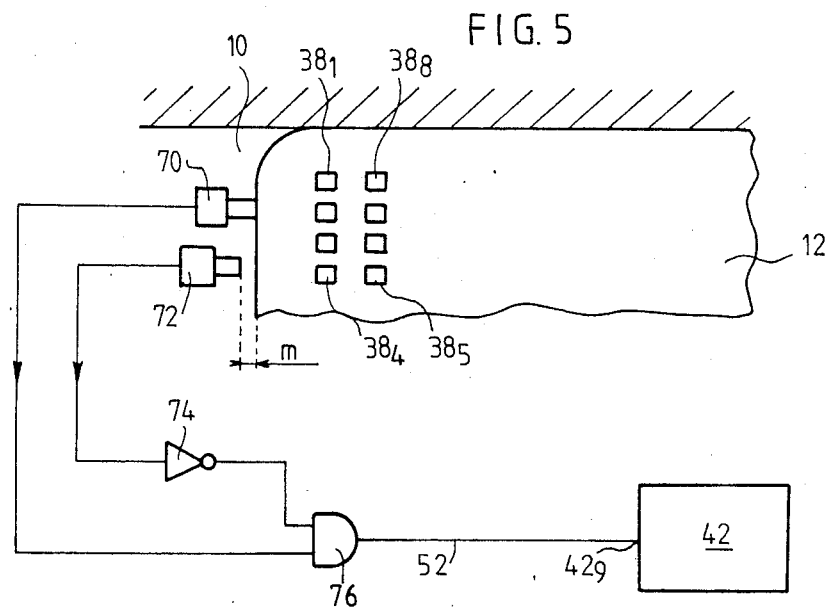

APPARATUS FOR READING ELECTRONIC MEMORY CARDS

BACKGROUND OF THE INVENTION

This invention relates to card readers for cedit-card type electronic memory cards. Such readers have a card introduction and guide slot into which a card is inserted. The memories for such cards generally include the memory proper and associated memory read and write control circuits, decoding and addressing circuits, all of which are implanted in the card. The circuit terminals are connected to contact pads on the card surface. The reader has electrical contact elements for contacting the card contact pads. Electrical power and signals are supplied through the contact elements and pads to the integrated circuit.

As the card is inserted into the slot the card reader contact elements and the card contact pads progressively overlap. Whatever precautions are taken in fabrication so that the reader contact elements present the same spatial configuration as the card contact pads, the contact pad length along the axis of card movement sometimes permits contact connections to be established out of order. Electrical power supply or information transfer signals applied to the integrated circuit of the card in the wrong order can deteriorate or cause a malfunction in the card.

SUMMARY OF THE INVENTION

To remedy this inconvenience, the primary object of the invention is to furnish an electronic memory card reader ("reader") which avoids the risk of misapplying electrical power supply or information signals to the card contact pads when the card is inserted into the reader.

To attain this object, the card reader according to this invention provides a position detector inside the card introduction slot, which detects whether, with respect to the card reader contact elements, the card occupies a required position. The invention provides means for applying the information and/or power supply to the contact elements only when the card is in the required position, so that the integrated circuit receives the electrical signals in the correct order. Other characteristics and advantages of the invention will appear more clearly in reading the following description of several embodiments given as non-limiting examples.

BRIEF DESCRIPTION OF THE DRAWING

FIG. 1 is a partial vertical section of the card reader;

FIG. 5 is another variation of the card position detector.

DETAILED DESCRIPTION OF THE PREFERRED EMBODIMENTS

Figure 2:
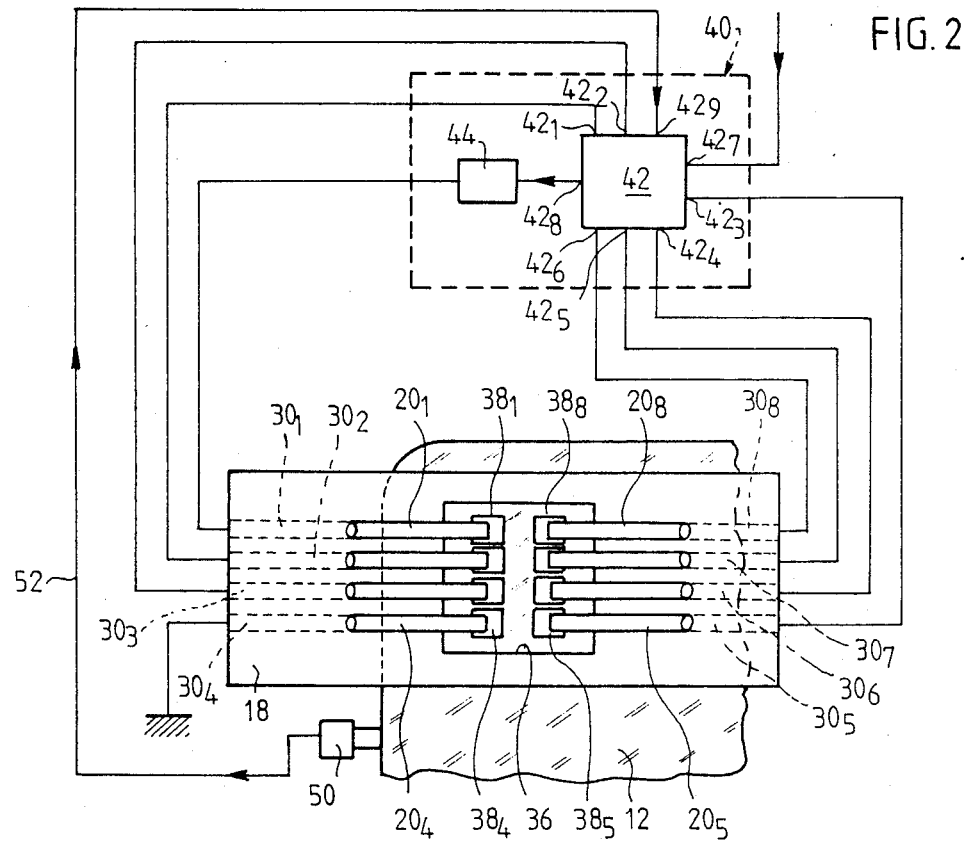
FIG. 2 is a partial top view showing the group of card reader contact elements and a first embodiment of the associated electronic circuit.

FIG. 1 represents part of a card reader introduction slot 10 into which an electronic memory card 12 can be inserted in the direction indicated by arrow 13. Card 12 slides on a wall 14. A card engagement roler 16 driven by a motor in either direction may assist introducing the card into and ejecting it from the reading position. Counter-rollers, not shown, may be opposed to roller 16. However, this invention applies equally to unassisted introduction card readers. Slot 10 also preferably includes lateral guides, not shown.

Contact pads 38-1 to 38-8 are arranged in two rows on the upper face 12a of card 12 as shown in FIG. 2. Only one contact pad is shown in FIG. 1. Pads 38 have, for example, a length of 2.3 mm along the axis of card movement.

Electric contact elements 20 are mounted on an isolating partition 18 in the upper part of slot 10. As is seen in FIG. 2, the reader preferably includes eight contact elements or as many as are appropriate for the cards. The card reader contact elements 20-1 to 20-8 are arranged in two rows with the spacial disposition of the element ends 22 matching as closely as possible that of the card contact pads. Due to the small distance separating the two rows of contact pads, the two rows of contact elements 20 approach from opposite directions. For clarity's sake, only one contact element 20 is represented in FIG. 1. Each element 20 is a conductive leaf having a flexible end 2 projecting into slot 10. An angled end 24 of each leaf 20 penetrates a first opening 26 in the isolating partition 18, and is fixed in a conductive filling 28 to electrically connect leaf 20 to a conductive strip 30 deposited on a face of partition 18. Each leaf 20-1 to 20-8 is connected to a conductive strip 30-1 to 30-8 which is in turn connected to the card reader information treatment circuit. An angled portion 32 of leaf 20 is cemented in an opening 34 in partition 18. The leaf traverses an opening 36 in the partition, and the free end 22 of the leaf forms a contact surface.

The invention provides a card position detector inside slot 10. In the example of FIGS. 1 and 2, the position detector is a movable micro-contact 50 which delivers, by a conductor 52, an electric signal when the card 12 is in the required position. Contactor 50 is preferably situated so that the mobile part 50' will be touched by the rear border of the card when the card is in the ideal position with the axes of the two rows of contact pads coninicident with the respective lines connecting the contact points of the two rows of leaves. This assures that detector 50 will not deliver the detection signal until the contact pads and the contact elements are aligned.

As is seen in FIG. 2, the card reader 40 treatment circuit includes essentially a microprocessor 42 and a power supply 44. Strip 30-1 is connected to the power supply 44, and strip 30-4 is connected to ground. The remaining strips 30-2, 30-3, and 30-5 to 30-8 are connected to the inputs/outputs 42-1 to 42-6 of the microprocessor 42.

Depending upon the types of microprocessor utilised in the card reader and in the card 12, and depending upon the functions fulfilled by the card, these inputs-outputs may be used for a clock signal, an auxiliary card power supply, the reading or writing mode command, and for transferring logical information between the card memory and the card reader. Microprocessor 42 has an input 42-7 for receiving information provided directly to the card reader, for example a card holder's personal identification code. The microprocessor has an output 42-8 for activating the electrical power supply 44.

The card position detector 50 output conductor 52 leads to microprocessor 42 activation input 42-9. When the card is not in the required reading position, no detection signal is applied to activation input 42-9, no signal is delivered by microprocessor 42 to outputs 42-1 to 42-6 and 42-8, the power supply 44 does not deliver a signal, and no signals are present on the contact elements 20-1 to 20-8. When the detection signal is applied to microprocessor input 42-9, the information signals and the electrical supply are delivered in a determined order. A range of card positions valid for connecting the reader could be defined by using a micro-contact having a predetermined hysteresis.

Figure 4:
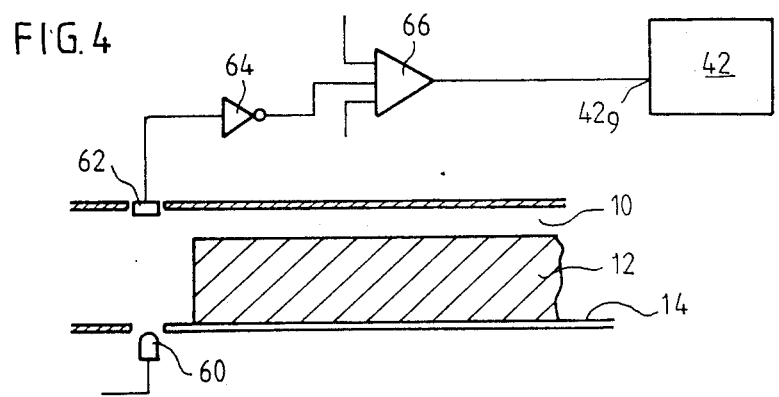
FIG. 4 is a variation of the card position detector.

FIG. 4 represents an alternative embodiment of the card position detector using an optical detector. A light source 60 is disposed on one side of slot 10 and a photodiode 62 is disposed on the opposite side. The photodiode 62 output is connected to an inverter circuit 64 which in turn has its output connected to a double-threaded circuit 66. The output of circuit 66 is connected to the activation input 42-9 of the microprocessor. In the absence of a card, light source 60 shines full strength on photodiode 62, and the inverter 64 output signal level is below the lower threshold of circuit 66. There is no detection signal. If the card partially masks the light from reaching photodiode 62, the inverter 64 signal level is between the two thresholds of circuit 66 and there is a detection signal. Finally, if the card totally masks photodiode 62, the inverter 62 output signal is above the upper threshold of circuit 66, and there is no detection signal. The two thresholds limit a range of card positions for which the card is effectively connected to the inputs and outputs of microprocessor 42 and to the electric power supply 44. This range, around the ideal card position, is substantially less than the length of the contact pads 38-1 to 38-8 along the axis of card movement.

Referring to FIG. 5, the range of card positions is defined in another alternate embodiment by two micro-contacts 70 and 72 offset along the axis of card movement by a distance M defining the valid range of card positions. Each of the micro-contacts 70 and 72 delivers a detection signal when contacted by the rear edge of a card. The output of micro-contact 72, which is further from the slot, is connected to the input of an inverter circuit 74. The output of inverter 74 and the output of micro-contact 70 are connected to the inputs of an AND gate 76. The output of the AND gate is a logic one detection signal only if the rear edge of the card acts on micro-contact 70 but does not act on micro-contact 72. When micro-contact 72 is activated, the detection signal disappears. The AND gate 76 output is connected by the conductor 52 to the input 42-9 of microprocessor 42.

Figure 3:
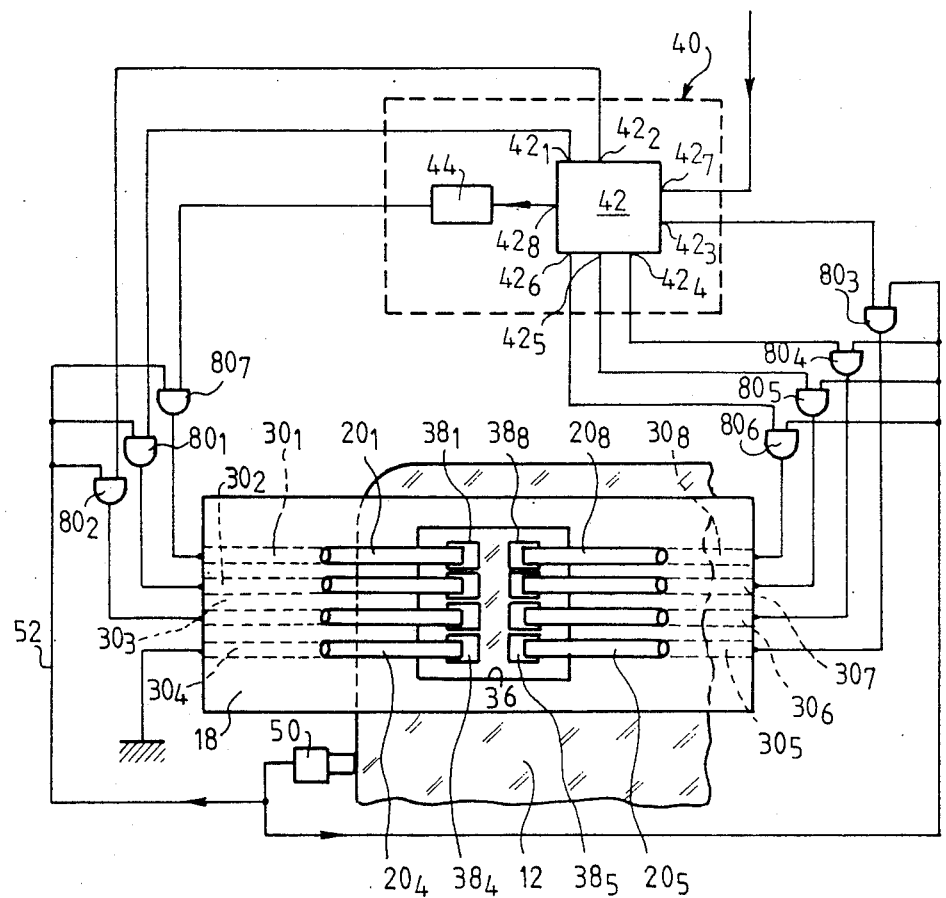
FIG. 3 is a variation of the FIG. 2 electronic circuit embodiment.

According to a variation of the invention, represented in FIG. 3, the detection signal delivered by the card-presence detector does not serve to activate microprocessor 42, but rather to close interruptors interposed between at least certain ones of the contact elements and the corresponding inputs/outputs of microprocessor 42. FIG. 3 shows a commanded interruptor 80-1 to 80-6 respectively on each of the lines connecting the conductive strips 30-2, 30-3 and 30-5 to 30-8 to the inputs/outputs 42-1 to 42-6 of microprocessor 42. An interruptor 80-7 is also mounted between strip 30-1 and the power supply 44 output. The output of micro-contact 50 is connected by the lines globally referenced 52 to a command input of each interruptor. In the absence of a detection signal from detector 50, interruptors 80-1 to 80-7 cut the connections between the power supply source 44 and the microprocessor 42 on the one hand, and the contact elements 20-1 to 20-3 and 20-5 to 20-8 on the other hand.

On the contrary, when the card presence detection signal is present on lines 52, interrupters 80-1 to 80-7 are closed and microprocessor 42 can apply electrical signals in the intended order to the card contact pads.

Interruptors 80-1 to 80-7 can be electronic circuits, micro-relays, etc. Of course, the embodiment of FIG. 3 can be utilised in combination with the card-presence detectors described with reference to FIGS. 4 and 5.

Although specific embodiments have been described, those skilled in the art will be able to modify the invention without departing from its scope, which is defined by the following claims.

I claim:

1. A reader for electronic memory cards of the type including an integrated circuit and electric contact pads, comprising:
   a card introduction slot;
   electrical power means for supplying electrical power to said integrated circuit;
   an information treatment circuit for delivering information signals to said integrated circuit;
   contact elements disposed in said introduction slot;
   detector means located within said introduction slot for detecting when said card is in a predetermined position such that each one of said contact elements is in physical contact with a corresponding electric contact pad; and
   control means responsive to said detector means for controlling said electrical power means and said information treatment circuit and for applying said electrical power and said information signals to said contact elements only when said detector means detects that said card is in said predetermined position.

2. Apparatus as in claim 1, wherein the detector means comprises an electrical contactor delivering an electrical detection signal when the rear edge of a card touches the contactor, and wherein the detection signal activates the information treatment circuit and the electrical power means.

3. Apparatus according to claim 1, wherein the connector means includes a plurality of interruptors mounted between at least some outputs of the information treatment circuit and the electrical power means and the corresponding electrical contact elements and responsive to the detector means to apply electrical power to the contact elements only when a card is in said predetermined position.

4. Apparatus as in claim 1, wherein the electrical contact elements comprise a plurality of flexible conductive leaves fixed on an isolating partition, a first end of each leaf protruding into the introduction slot, a second end of each leaf being electrically connected to a conductive strip disposed on a face of the isolating support.

5. Apparatus as in claim 1, wherein the detector means detects if the card is in a position within a predetermined range of positions.

* * * * *